(12) United States Patent
Sakauchi et al.

(10) Patent No.: US 10,059,373 B2
(45) Date of Patent: Aug. 28, 2018

(54) VEHICLE BODY REINFORCEMENT DEVICE

(71) Applicant: AISIN SEIKI KABUSHIKI KAISHA, Kariya-shi, Aichi-ken (JP)

(72) Inventors: Kazuma Sakauchi, Toyota (JP); Soichiro Iwanaga, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 71 days.

(21) Appl. No.: 15/393,412

(22) Filed: Dec. 29, 2016

(65) Prior Publication Data

US 2017/0267289 A1 Sep. 21, 2017

(30) Foreign Application Priority Data

Mar. 18, 2016 (JP) ................. 2016-055359

(51) Int. Cl.
  *B60J 7/00* (2006.01)
  *B62D 21/03* (2006.01)
  *B62D 27/04* (2006.01)

(52) U.S. Cl.
  CPC ............. *B62D 21/03* (2013.01); *B62D 27/04* (2013.01)

(58) Field of Classification Search
  CPC ......... A01B 35/20; A01B 43/00; A01B 49/02; B67D 9/02; E01C 11/126; B60R 19/18; B29D 30/08; B60T 13/406; B61D 3/04; B61D 3/18
  USPC .................................................. 296/203.03
  See application file for complete search history.

(56) References Cited

U.S. PATENT DOCUMENTS

| | | | | |
|---|---|---|---|---|
| 2,705,634 | A * | 4/1955 | Sampson | F16F 7/09 267/203 |
| 4,031,978 | A * | 6/1977 | Taylor | B60R 19/26 180/232 |
| 5,257,680 | A | 11/1993 | Corcoran et al. | |
| 6,467,836 | B1 * | 10/2002 | Miller | B60R 19/00 188/374 |

(Continued)

FOREIGN PATENT DOCUMENTS

| JP | 4865698 B | 2/2012 |
|---|---|---|
| JP | 2015-003546 A | 1/2015 |

(Continued)

OTHER PUBLICATIONS

The extended European Search Report dated Jun. 9, 2017, by the European Patent Office in corresponding European Patent Application No. 16203492.0 (9 pgs).

*Primary Examiner* — Kiran B Patel
(74) *Attorney, Agent, or Firm* — Buchanan Ingersoll & Rooney PC

(57) ABSTRACT

A vehicle body reinforcement device includes a housing including a first retaining portion and a second retaining portion each disposed at an inner portion of the housing, the inner portions that are spaced apart from each other by a predetermined distance in the axial direction, a first shaft member, a second shaft member, a first biasing member, a second biasing member, and a pressing member supported on the first shaft member so as to be movable in a direction orthogonal to an axis of the first shaft member within the housing and to be contactable with an inner surface of the housing, the pressing member pressing the inner surface of the housing.

10 Claims, 3 Drawing Sheets

(56) References Cited

U.S. PATENT DOCUMENTS

| | | | | |
|---|---|---|---|---|
| 7,673,904 B2* | 3/2010 | Harada | ............... | B62D 21/15 |
| | | | | 280/782 |
| 9,822,838 B2* | 11/2017 | McCoy | ............... | F16F 7/09 |
| 9,845,113 B2* | 12/2017 | Sawai | ............... | F16F 9/26 |
| 2002/0056969 A1* | 5/2002 | Sawai | ............... | B62D 25/082 |
| | | | | 280/124.146 |
| 2014/0375041 A1* | 12/2014 | Nakajima | ............... | F16F 9/3207 |
| | | | | 280/782 |
| 2016/0059808 A1* | 3/2016 | Ohtani | ............... | B60R 19/02 |
| | | | | 293/104 |

FOREIGN PATENT DOCUMENTS

| | | |
|---|---|---|
| JP | 2015-003547 A | 1/2015 |
| JP | 2016 084066 A | 5/2016 |
| WO | 9313333 A2 | 7/1993 |

\* cited by examiner

VEHICLE BODY REINFORCEMENT DEVICE

CROSS REFERENCE TO RELATED APPLICATIONS

This application is based on and claims priority under 35 U.S.C. § 119 to Japanese Patent Application 2016-55359, filed on Mar. 18, 2016, the entire content of which is incorporated herein by reference.

TECHNICAL FIELD

This disclosure generally relates to a vehicle body reinforcement device that is mountable on, specifically, a vehicle.

BACKGROUND DISCUSSION

A vehicle body reinforcement device that may be attached on a vehicle and that is supported on a vehicle body via brackets that are disposed at opposing ends of the vehicle body in an axial direction is known. For example, as disclosed in JP4865698B (hereinafter referred to as Patent reference 1), a reinforcement device for a vehicle body is specified by various requirements in order to provide the reinforcement device for the vehicle body of the vehicle that easily enhances a riding comfort by selective attachment and removal of the reinforcement device for the vehicle body in accordance with a preference of a driver (see Paragraph [0011] of Patent reference 1). The reinforcement device for the vehicle body of a vehicle is formed in an elongated shape and includes an oil-pressure-type damper that is provided on an intermediate portion of the reinforcement device for the vehicle. The oil-pressure-type damper serves as an oil-pressure-type damping force generating device that generates damping force against a deformation of the reinforcement device for the vehicle body expanding and contracting in a longitudinal direction of the reinforcement device for the vehicle body (see Paragraph [0012] of Patent reference 1).

A known vehicle body reinforcement unit is disclosed in JP2015-3546A (hereinafter referred to as Patent reference 2). The vehicle body reinforcement unit includes a reinforcement member and a displacement inhibition mechanism. The reinforcement member is disposed between a pair of frame portions of a vehicle body. The displacement inhibition mechanism applies biasing force against a displacement of the pair of frame portions, the displacement that corresponds to at least one of enlarging displacement of the pair of frame portions in a direction enlarging a relative distance between the pair of frame portions, and contracting displacement of the pair of frame portions in a direction contracting the relative distance between the pair of frame portions (see Paragraph [0011] of Patent reference 2). Similarly, a vehicle body reinforcement unit is disclosed in JP2015-3547A (hereinafter referred to as Patent reference 3). The vehicle body reinforcement unit disclosed in Patent reference 3 includes a pair of displacement members and a damper mechanism. The pair of displacement members is relatively displaced in response to a relative displacement of a pair of frame portions. The damper mechanism applies braking force to the pair of displacement members that moves relatively. As disclosed in Patent reference 3, the damper mechanism may include a cylindrical portion, an internal fitting portion, a friction member, and a biasing member. The cylindrical portion serving as one of the pair of displacement members is coaxial with an axis of a reinforcement member in a longitudinal direction of the reinforcement member. The internal fitting portion serving as the other of the pair of displacement members is coaxial with the axis of the reinforcement member and internally fits in the cylindrical portion. The friction member is in contact with an inner circumference of the cylindrical portion or an outer circumference of the internal fitting portion. The biasing member biases the friction member in a contact direction where the biasing member and the friction member come in contact with each other (see Paragraph [0011] and [0013] of Patent reference 3).

The reinforcement device for the vehicle body disclosed in Patent reference 1 includes the oil-pressure-type damper as a damping force generation device. However, not only that the damping force against the displacement of the reinforcement device for the vehicle body is not easily adjusted, but also that various oil-pressure-type dampers are required in accordance with a type of a vehicle or a portion on which the damper is mounted. Accordingly, the reinforcement device for the vehicle body disclosed in Patent reference 1 lacks versatility in terms of a retrofit that is mountable on the vehicle. On the other hand, each of the vehicle body reinforcement units disclosed in Patent references 2 and 3 has the versatility. The structure is easily established and the cost may be reduced (see Paragraph [0012] of Patent references 2 and 3). However, the upsizing of the vehicle body reinforcement units disclosed in Patent references 2 and 3 is inevitable, and further modification is desired. Specifically, the displacement inhibition mechanism and the damper mechanism disclosed in Patent references 2 and 3 are desired to include structures in which appropriate pressure load may be applied without upsizing the devices.

A need thus exists for a vehicle reinforcement device which is not susceptible to the drawback mentioned above.

SUMMARY

According to an aspect of this disclosure, a vehicle body reinforcement device being configured to be supported on a vehicle body via first and second brackets that are disposed at opposing ends of the vehicle body in an axial direction of the vehicle body reinforcement device includes a housing being connected to one of the first bracket and the second bracket, the housing including a first retaining portion and a second retaining portion each disposed at an inner portion of the housing, the inner portions that are spaced apart from each other by a predetermined distance in the axial direction, a first shaft member being contained in the housing and including a first end portion that is supported so as to be approachable and separable relative to the first retaining portion, a second shaft member including a first end portion that is connected to a second end portion of the first shaft member, the second shaft member including a second end portion that is connected to the other of the first bracket and the second bracket, a first biasing member being provided between the first end portion of the first shaft member and the first retaining portion, a second biasing member being provided between the second end portion of the first shaft member and the second retaining portion, and a pressing member supported on the first shaft member so as to be movable in a direction orthogonal to an axis of the first shaft member within the housing and to be contactable with an inner surface of the housing, the pressing member pressing the inner surface of the housing.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
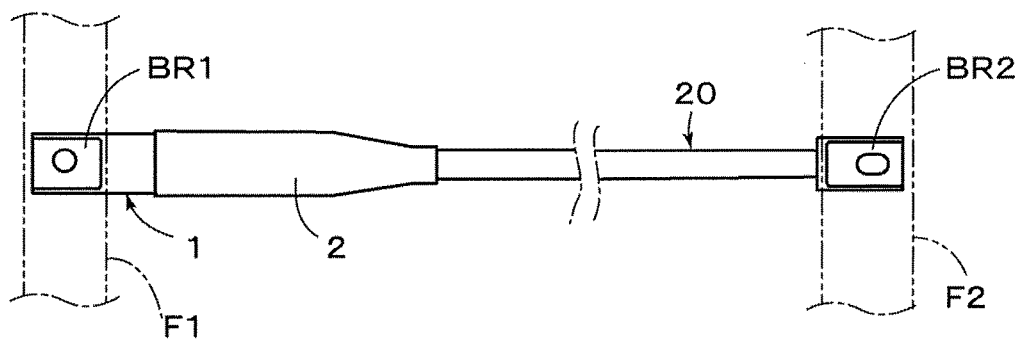
FIG. 1 is a plan view illustrating a structure of a vehicle body reinforcement device according to a first embodiment disclosed here.

Favorable embodiments of this invention will hereunder be explained with reference to the drawings. In FIG. 1, a vehicle body reinforcement device is supported on a first frame F1 and a second frame F2 of a vehicle body via a first bracket BR1 and a second bracket BR2 that are disposed at opposing ends of the vehicle body in an axial direction of the vehicle body reinforcement device. The bracket BR1 is integrally formed with a part of a housing 1. A first end portion of a first rod member 10 (i.e., serving as a first shaft member) in FIG. 2 and a first end portion of a second rod member 20 serving as a second shaft member are contained in the housing 1. The second bracket BR2 is integrally formed with a second end portion of the second rod member 20. The first and second brackets BR1, BR2 may be separately formed from the housing 1 and the second rod member 20, respectively, and may be threadedly engaged with the housing 1 and the second rod member 20. Connecting structures of the first and second brackets BR1, BR2, the housing 1 and the second rod member 20 may be flexible.

Figure 2:
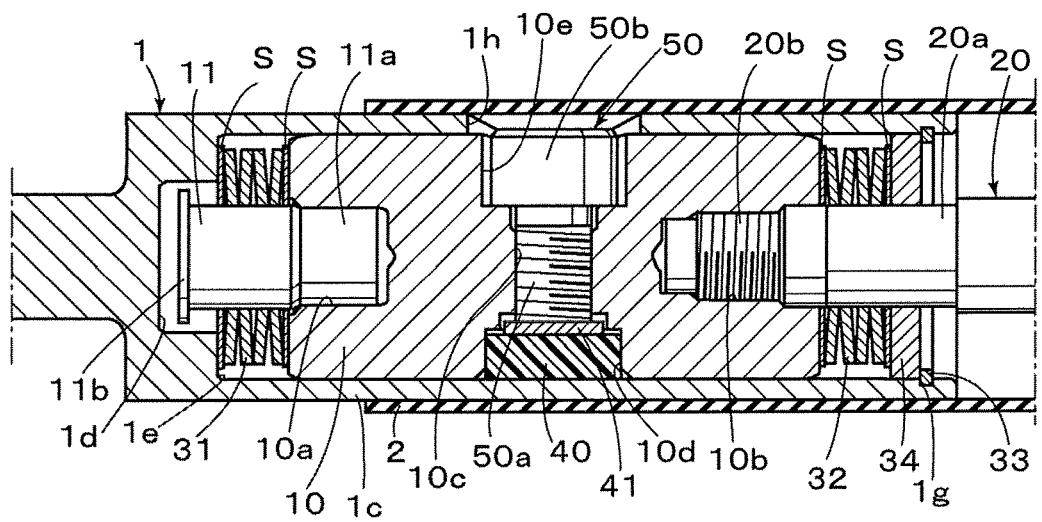
FIG. 2 is a longitudinal cross sectional view illustrating a part of the vehicle body reinforcement device according to the first embodiment.

FIG. 2 illustrates a cross section of a part of the vehicle body reinforcement device (a left in FIG. 1). Plural plate springs (hereinafter referred to as a first plate spring 31 that serves as a first biasing member) are stacked with one another to serve as a first biasing member applying a biasing force against a force enlarging and contracting the distance between the first bracket BR1 and the second bracket BR2 in an axial direction of the first and second brackets BR1, BR2. Plural plate springs (hereinafter referred to as a second plate spring 32 that serves as a second biasing member) are stacked with one another to serve as a second biasing member applying the biasing force against the force enlarging and contracting the distance between the first bracket BR1 and the second bracket BR2 in the axial direction of the first and second brackets BR1, BR2. The first and second plate springs 31, 32 are contained in the housing 1. Alternatively, other spring members may be applied as the first and second biasing members. A pressing member 40 and an adjustment member 50 are supported on the first rod member 10 in the housing 1 and press an inner surface of the housing 1 in a direction orthogonal to an axis of the first rod member 10.

Figure 3:
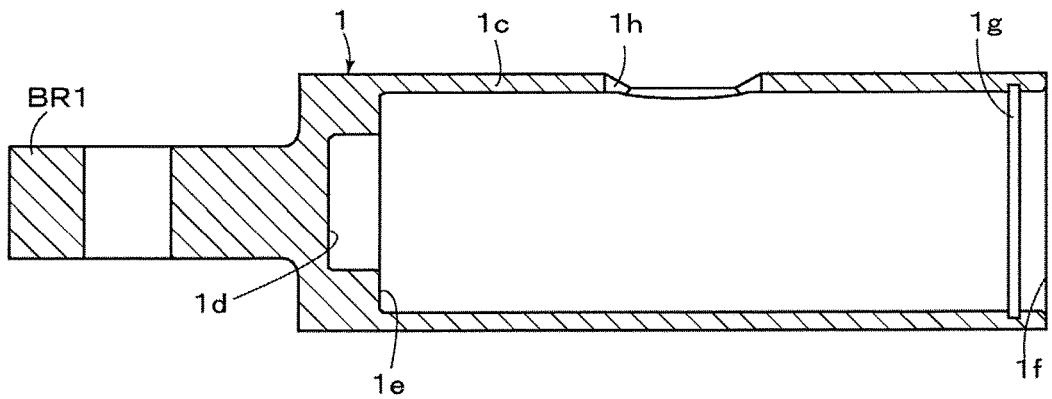
FIG. 3 is a longitudinal cross sectional view of a housing according to the first embodiment.

As shown in FIG. 3, the first bracket BR1 is integrally formed with the housing 1 of the embodiment. The housing 1 is formed with a bottomed-cylindrical case 1c, an annular step portion 1e (i.e., serving as a retaining portion), and an annular groove portion 1g. The case 1c contains the first end portion of the second rod member 20. The step portion 1e is disposed close to a bottom portion 1d of the case 1c. The groove portion 1g is provided at a first opening portion 1f (i.e., serving as an opening portion) of the case 1c. In a state where the first rod member 10 is contained in the housing 1 as shown in FIG. 2, the first end portion (a left end portion in FIG. 2) of the first rod member 10 is supported on the step portion 1e so as to be approachable and separable. The first end portion of the second rod member 20 (the left end portion in FIG. 2) is connected to a second end portion (a right end portion in FIG. 2) of the first rod member 10. The second bracket BR2 is integrally formed with the second end portion (the right end portion in FIG. 2) of the second rod member 20.

Figure 4:
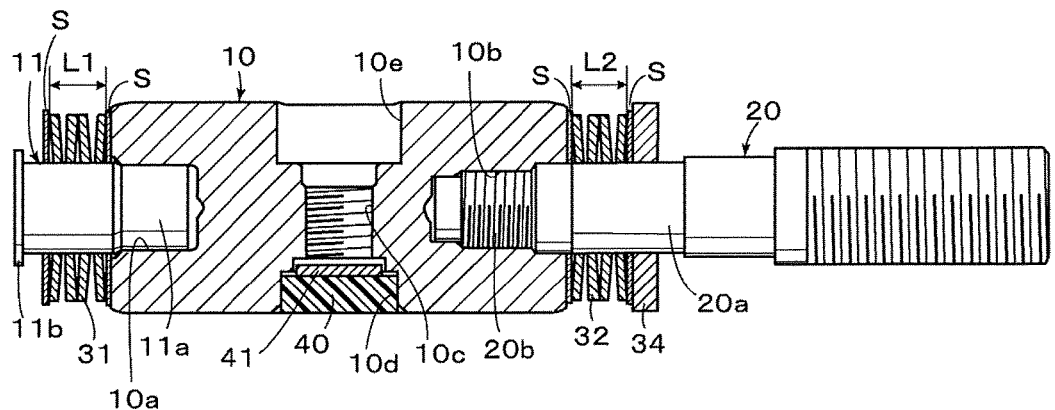
FIG. 4 is a longitudinal cross sectional view of a subassembly according to the first embodiment.

As shown in FIG. 4, the first rod member 10 includes a fitting hole 10a and a first thread hole 10b that are disposed at opposing ends of the first rod member 10 in the axial direction. A second thread hole 10c is provided at an intermediate portion of the first rod member 10 in a direction orthogonal to the axis of the first rod member 10. A recess 10d is continuously provided with the second thread hold 10c. An opening portion 10e is provided opposite to the recess 10d. As shown in FIGS. 2 and 3, the housing 1 includes a second opening portion 1h at a predetermined position opposing to the opening portion 10e of the first rod member 10. A shaft 11 serving as a support member of the first plate spring 31 is press-fitted to the fitting hole 10a of the first rod member 10, and is extendingly connected to the first rod member 10 in the axial direction. The shaft 11 is provided with a press-fit portion 11a and a flange portion 11b. A recessed portion is provided at a middle portion of a bottom portion 1d of the housing 1 so that the flange portion 11b is contained in the housing 1 without coming in contact with the housing 1 within a movement range of the shaft 11.

Meanwhile, the second rod member 20 includes a support portion 20a for supporting the second plate spring 32, and a male thread portion 20b that is continuously formed with the support portion 20a. As shown in FIGS. 2 and 4, the male thread portion 20b is threaded into the thread hole 10b of the first rod member 10 so as to be connected to the first rod member 10. An annular board-shaped plate 34 (i.e., serving as a retaining member, a second retaining portion) is contained in the housing 1 as a retaining portion preventing the second plate spring 32 being supported on the support portion 20a from moving in the axial direction. According to the first embodiment, the plate 34 is retained such that the groove portion 1g of the case 1c is fitted with a snap ring 33. The snap ring 33 of the first embodiment is made from an elastic metal material and is formed in a C-shape having a clearance in a circumferential direction. The snap ring 33 serves as a resilient member.

According to the first embodiment, the step portion 1e serves as a first retaining portion, and the plate 34 serves as a second retaining portion. As shown in FIG. 2, the first plate spring 31 (i.e., serving as a first biasing member) is disposed between the first end portion of the first rod member 10 and the step portion 1e (the first retaining portion). The second plate spring 32 is disposed between the second end portion of the first rod member 10 and the plate 34 (the second retaining portion). Alternatively, in a case where the plate 34 is press-fitted in the housing 1 (the case 1c), the snap ring 33 and the groove portion 1g do not have to be provided. According to the first embodiment, each of sims (representatively referred to as S) is provided at a portion between the housing 1 (the case 1c) and the first plate spring 31, a portion between the first plate spring 31 and the first rod member 10, a portion between the first rod portion 10 and the second plate spring 32, and a portion between the second plate spring 32 and the plate 34. Each of the sims prevents friction caused by a difference of materials of the components.

As shown in FIG. 2, for example, the pressing member 40 made of synthetic resin is contained in the recess 10d of the first rod member 10. The pressing member 40 is movably supported in the housing 1 in a direction orthogonal to the axis of the first rod member 10, and is contactably supported on the inner surface of the housing 1. That is, the pressing member 40 is disposed so as to press the inner surface of the housing 1. A male thread portion 50a of the adjustment member 50 is threaded into the thread hole 10c so as to be supported on the first rod member 10. By a movement of the male thread portion 50a in the axial direction, the pressing member 40 is disposed so as to be adjustable of the pressing force of the pressing member 40 against the inner surface of the housing 1.

The adjustment member 50 includes a rotary operation head portion 50b that is continuously formed with the male thread portion 50a. As shown in FIG. 2, the rotary operation head portion 50b is disposed in the opening portion 10e of the first rod member 10, and is disposed so as to extend in the second opening portion 1h of the housing 1. Moreover, a plate 41 is disposed between the pressing member 40 and the adjustment member 50 so that the pressing member 40 does not rotate by a rotary force frictionally transmitted in accordance with the adjustment operation (the rotation of the male thread portion 50a) of the adjustment member 50. The rotary operation head portion 50b of the adjustment member 50 does not extend outwardly of the second opening portion 1h of the housing 1, and is mounted with a cylindrical cover 2 (for example, a rubber boot) being made from an elastic member as illustrated in FIGS. 1 and 2.

As described above, the vehicle body reinforcement device is mounted on the first frame F1 and the frame F2 that are illustrated with two-dot chain lines in FIG. 1, and is fixed with bolts. In a case where an outer force in a direction enlarging the distance between the first bracket BR1 and the second bracket BR2 in the axial direction is applied to the vehicle body reinforcement device, the biasing force contracting the distance between the first bracket BR1 and the second bracket BR2 in the axial direction by the contraction of the first plate spring 31 shown in FIG. 2 is applied to the vehicle body reinforcement device. On the other hand, in a case where an outer force in a direction contracting the distance between the first bracket BR1 and the second bracket BR2 in the axial direction is applied to the vehicle body reinforcement device, the biasing force enlarging the distance between the first bracket BR1 and the second bracket BR2 in the axial direction by the contraction of the second plate spring 32 is applied to the vehicle body reinforcement device. Accordingly, the stiffness of the first and second brackets BR1, BR2 is adjusted and each of the first and second brackets BR1, BR2 serves as a stiffness adjustment mechanism. In this operation, the frictional force applied to the second rod member 20 by the pressing member 40 and the adjustment member 50 works as a braking force, and works as a damping mechanism that inhibits a rapid displacement and an oscillation when the vehicle oscillates.

Next, a mounting procedure of the vehicle body reinforcement device will be explained with reference to FIGS. 3 to 5. As shown in FIG. 4, the shaft 11 is press fitted to the fitting hole 10a of the first rod member 10 while supporting the first plate spring 31 (and sim S). The male thread portion 20b of the second rod member 20 is threaded into the thread hole 10b of the first rod member 10 while supporting the second plate spring 32 and the plate 34. At this time, the flange portion 11b prevents the first plate spring 31 from being removed from the shaft 11. Because the plate 41 is contained in the recess 10d of the first rod member 10, and the pressing member 40 is fitted in the recess 10d, the plate 41 and the pressing member 40 are prevented from being removed by the own weights. A subassembly in a supported state is established as shown in FIG. 4.

According to the aforementioned subassembly, a first free length (L1) of the first plate spring 31 in the axial direction of the first rod member 10 is set longer than a first length (G1 in FIG. 5) between the first end portion of the first rod member 10 and the step portion 1e (the first retaining portion) in the axial direction. A second free length (L2) of the second plate spring 32 in the axial direction of the first rod member 10 is set longer than a second length (G2 in FIG. 5) between the second end portion of the first rod member 10 and the plate 34 (the second retaining portion) in the axial direction (in either cases, the thickness of the sim S is not included).

The subassembly shown in FIG. 4 is contained in the case 1c shown in FIG. 3. When the snap ring 33 is fitted in the groove portion 1g of the housing 1, the housing 1 comes to be as shown in FIG. 5. That is, in a case where the subassembly shown in FIG. 4 is contained in the case 1c while applying the contracting force to the first and second plate springs 31, 32, as shown in FIG. 5, the first plate spring 31 is contracted between the first rod member 10 and the step portion 1e, and the second plate spring 32 is contracted between the first rod member 10 and the plate 34. The lengths of the first and second plate springs 31, 32 in the axial direction correspond to the first length G1 and the second length G2, respectively. The contracting force (outline arrows P in FIG. 5) during this time is applied to the step portion 1e and the plate 34, and large contracting force does not apply to the first rod member 10 and the second rod member 20. Accordingly, great shear force does not apply to the thread portion between the thread hole 10b of the first rod member 10 and the male thread portion 20b of the second rod member 20.

Accordingly, when each of the components is assembled in the housing 1 (the case 1c), the first and second rod members 10, 20 do not have to be mounted on the housing 1 against the biasing force of the first and second plate springs 31, 32. Thus, the assembling is easy. Because the thread force of the thread hole 10b and the make thread portion 20b may be minimum required performance, each of radiuses of the first rod member 10 and the second rod member 20 may be decreased. Accordingly, the device may be downsized. Because each of the biasing forces of the first and second plate springs 31, 32 may be minimized, the device may be downsized. In addition, because the subassembly shown in FIG. 4 may be mounted on the bottomed cylindrical case 1c from a direction (right in FIG. 5), high-volume productivity may be enhanced and a dust-proofing mechanism or a water-proofing mechanism may be easily secured. Because assembling tools may be concentratedly provided at one side at the time of assembling, the vehicle body reinforcement device may be appropriately assembled without deteriorating the appearance.

Figure 5:
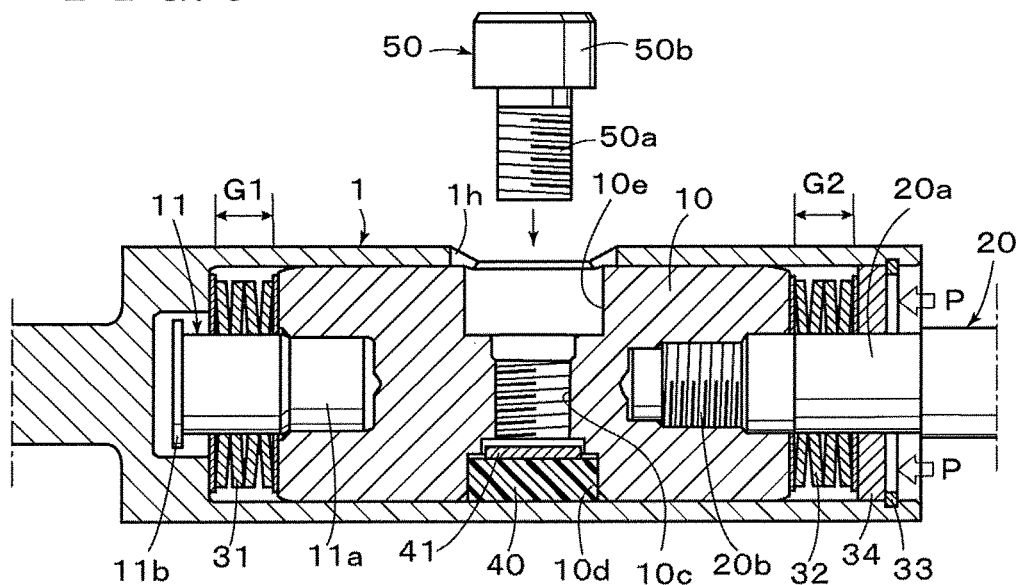
FIG. 5 is a longitudinal cross sectional view illustrating an assembling of a part of the vehicle reinforcement device according to the first embodiment.
Figure 6:
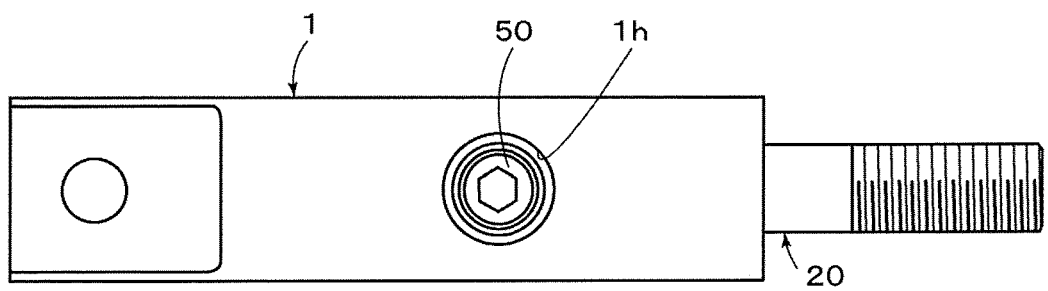
FIG. 6 is a plan view illustrating the part of the vehicle body reinforcement device according to the first embodiment.
Figure 7:
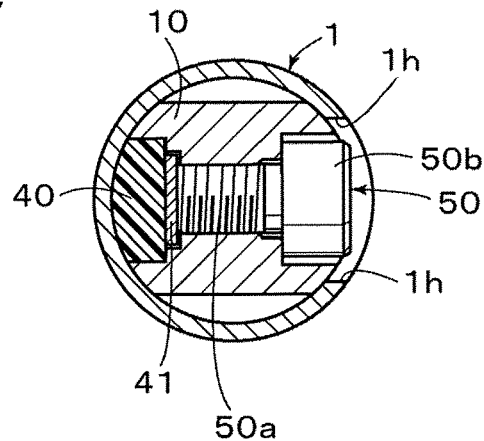
FIG. 7 is a lateral cross sectional view illustrating a part of the vehicle body reinforcement device according to the first embodiment.

Furthermore, as shown in FIG. 5, in a case where the adjustment member 50 is contained in the housing 1 (the case 1c) via the second opening portion 1h of the housing 1 and the opening portion 10e of the first rod member 10, and in a case where the male thread portion 50a rotates in the thread hole 10c of the first rod member 10, the pressing member 40 comes in pressingly contact with the inner surface of the housing 1 (the case 1c), and the pressing force of the pressing member 40, that is, the frictional force (the braking force) applied to the first rod member 10 is adjusted in response to the operation amount of the rotary operation head portion 50b. Accordingly, as shown in FIG. 2, the adjustment member 50 is retained in the housing 1 in a state where the rotary operation head portion 50b is disposed in the second opening portion 1h of the housing 1 and the opening portion 10e of the first rod member 10. Thus, because the cover 2 is attached on the housing 1 so as to cover the second opening portion 1h, the housing 1 comes to be sealed as shown in FIG. 2. As shown in FIGS. 2 and 6, the adjustment member 50 after the assembling is disposed such that a side surface of the rotary operation head portion 50b is contactably disposed at an inner surface of the second opening portion 1h of the housing 1 when the adjustment member 50 rotates in a direction orthogonal to an axis of the male thread portion 50a. Accordingly, the rotation of the adjustment member 50 may be easily and securely prevented, the rotation that may occur in accordance with the usage of the adjustment member 50 after the assembling of the adjustment member 50 to the vehicle, the rotation about the axis of the first rod member 10.

Figure 8:
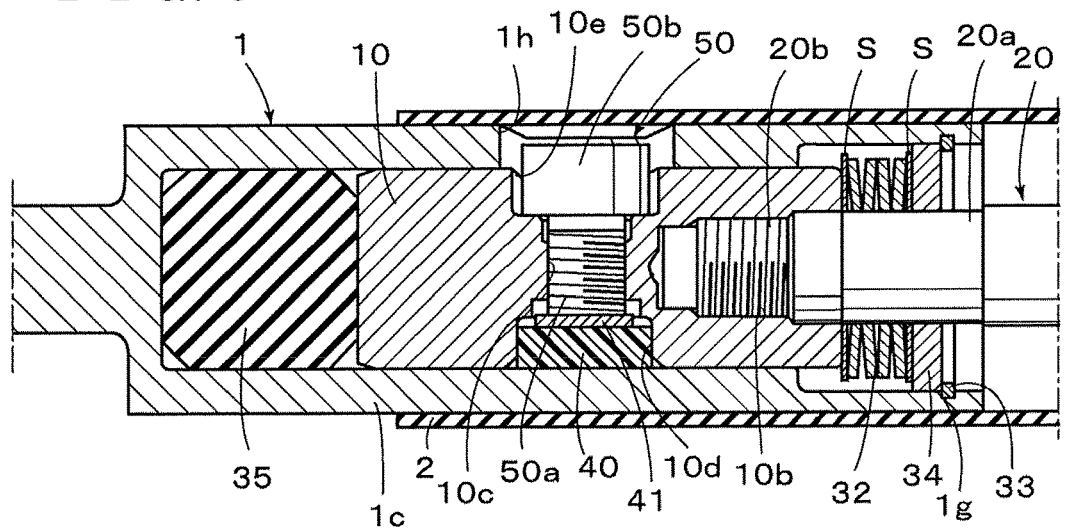
FIG. 8 is a longitudinal cross sectional view illustrating a vehicle body reinforcement device according to a second embodiment.

FIG. 8 shows a second embodiment of the disclosure. One of first and second biasing members corresponds to an elastic body 35, and the other of the first and second biasing members corresponds to a spring member (the second plate spring 32). According to the second embodiment, because the biasing force against the first rod member 10 corresponds to a combined force of the biasing force (the elastic force) of the elastic member 35 and the biasing force of the second plate spring 32, an outer diameter of the second plate spring 32 may be reduced in comparison with the first embodiment shown in FIG. 2. Thus, the vehicle body reinforcement device may be further downsized. Other structures of the vehicle body reinforcement device are similar to the first embodiment, and the same components as those described in the first embodiment are marked with the same reference materials, and description will not be repeated.

Figure 9:
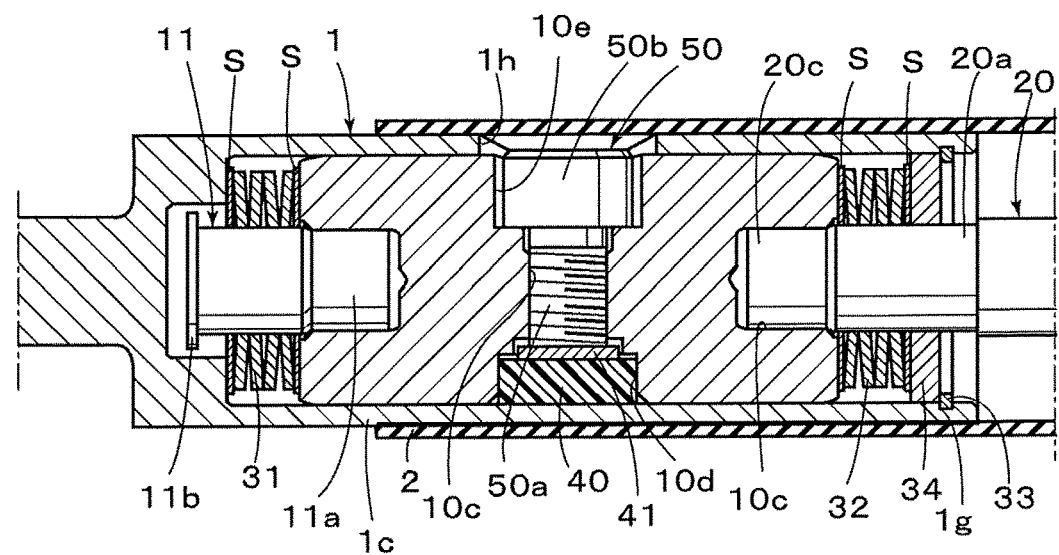
FIG. 9 is a longitudinal cross sectional view illustrating a part of a vehicle body reinforcement device according to a third embodiment.

In FIG. 9, similarly to the shaft 11, as a third embodiment, an axial portion 20c being continuously formed with the support portion 20a of the second rod member 20 is press fitted in the recessed portion 10c of the first rod member 10. Other structures of the vehicle body reinforcement device are similar to the first embodiment, and the same components as those described in the first embodiment are marked with the same reference materials, and description will not be repeated. Accordingly, similarly to the first and second embodiments, because the load applied to the first and second rod members 10, 20 when the first and second rod members 10, 20 are mounted on the vehicle body reinforcement device is reduced, the first and second rod members 10, 20 may be connected with each other only by a press-in process. Accordingly, the vehicle body reinforcement device may be further downsized.

According to the first, second and third embodiments, the vehicle body reinforcement device being configured to be supported on the vehicle body via the first and second brackets (BR1, BR2) that are disposed at the opposing ends of the vehicle body in the axial direction of the vehicle body reinforcement device includes the housing (1) being connected to one of the first bracket (BR1) and the second bracket (BR2), the housing (1) including the first retaining portion (the step portion 1e) and the second retaining portion (the plate 34) each disposed at the inner portion of the housing (1), the inner portions that are spaced apart from each other by a predetermined distance in the axial direction, the first shaft member (the first rod member 10) being contained in the housing (1) and including the first end portion that is supported so as to be approachable and separable relative to the first retaining portion (the step portion 1e), the second shaft member (the second rod member 20) including the first end portion that is connected to the second end portion of the first shaft member (the first rod member 10), the second shaft member (the second rod member 20) including the second end portion that is connected to the other of the first bracket (BR1) and the second bracket (BR2), the first biasing member (the first plate spring 31) being provided between the first end portion of the first shaft member and the first retaining portion (the step portion 1e), the second biasing member (the second plate spring 32) being provided between the second end portion of the first shaft member (the first rod member 10) and the second retaining portion (the plate 34), and the pressing member (40) supported on the first shaft member (10) so as to be movable in a direction orthogonal to an axis of the first shaft member (10) within the housing (1) and to be contactable with an inner surface of the housing (1), the pressing member (40) pressing the inner surface of the housing (1).

According to the aforementioned construction, the vehicle body reinforcement device may be downsized with an easy and costless structure. Accordingly, the vehicle body reinforcement device may be applied to various types, or to various mounting portions of vehicles. Moreover, the mountability on the vehicle may be enhanced, leading to enhance the flexibility for the structure of the vehicle body reinforcement device.

According to the aforementioned first, second and third embodiments, the vehicle body reinforcement device further includes the adjustment member (50) being supported on the first axial member (the first rod member 10), the adjustment member (50) adjusting the pressing force applied by the pressing member (40) against the inner surface of the housing (1).

According to the aforementioned construction, an appropriate frictional force may be applied to the first rod member 10.

According to the aforementioned first, second and third embodiments, the vehicle body reinforcement device further includes the support member (the shaft 11) being extendingly provided in the axial direction of the first shaft member (the first rod member 10), the support member (the shaft 11) being connected to the first end portion of the first shaft member (the first rod member 10) to support the first biasing member (the first plate spring 31).

According to the aforementioned construction, the first plate spring 31 may be easily mounted on the first rod member 10.

According to the first, second and third embodiments, the first biasing member (31) includes the first free length (L1) in the axial direction of the first shaft member (19), the first free length (L1) that is set longer than the first length (G1)

that is established when the first biasing member (the first plate spring 31) is disposed between the first end portion of the first shaft member (the first rod member 10) and the first retaining portion (the step portion 1e) of the housing 1 in the axial direction, the second biasing member (the second plate spring 32) includes the second free length (L2) in the axial direction of the first shaft member (10), the second free length (L2) that is set longer than the second length (G2) that is established when the second biasing member (the second plate spring 32) is disposed between the second end portion of the first shaft member (the first rod member 10) and the second retaining portion (the plate 34) of the housing (1) in the axial direction.

According to the aforementioned construction, when each of the components is assembled in the housing 1 (the case 1c), the first and second rod members 10, 20 are not inserted into, or mounted on the housing 1 against the biasing force of the first and second plate springs 31, 32. Accordingly, the assembling is easy, and the biasing force of the first and second plate springs 31, 32 may be minimized. Thus, the vehicle body reinforcement device may be downsized.

According to the first, second and third embodiments, the vehicle body reinforcement device further includes the retaining member (the plate 34) being retained in the housing (1), the retaining member (34) preventing the second biasing member (32) from moving in the axial direction, the retaining member (the plate 34) serving as the second retaining portion (the plate 34).

According to the aforementioned construction, the vehicle body reinforcement device may be easily mounted on the vehicle.

According to the first, second and third embodiments, the vehicle body reinforcement device includes the resilient member (the snap ring 33) being fitted to a groove portion (1g) that is formed at the inner surface of the housing (1), the resilient member (the snap ring 33) preventing the retaining member (the plate 34) from moving in the axial direction.

According to the aforementioned construction, the vehicle body reinforcement device may be easily and securely mounted on the vehicle.

According to the first, second and third embodiments, the housing (1) includes a bottomed cylindrical case (1c) having the bottom portion (1d) and the first opening portion (1f). The first retaining portion (the step portion 1e) is provided at a position close to the bottom portion (1d) of the case (1c). The second retaining portion (the plate 34) is provided at the first opening portion (1f) of the case (1c).

According to the aforementioned construction, the vehicle body reinforcement device may be easily mounted on the vehicle, and may be downsized.

According to the second embodiment, one of the first biasing member (the first plate spring 31) and the second biasing member (the second plate spring 32) is made from the elastic body (35), and the other of the first biasing member (the first plate spring 31) and the second biasing member (the second plate spring 32) is made from the spring member.

According to the aforementioned construction, the vehicle body reinforcement device may be further downsized with less number of components.

According to the first, second and third embodiments, the first shaft member (the first rod member 10) includes the thread hole (10c) being formed in the direction orthogonal to the axis of the first shaft member (the first rod member 10), the recess (10d) being continuously formed with the thread hole (10c) and containing the pressing member (40). The housing (1) includes the second opening portion (1h) being disposed at the predetermined position opposing the recess (10d) and facing the thread hole (10c). The adjustment member (50) includes the male thread portion (50a) threaded into the thread hole (10c), and the rotary operation head portion (50b) being continuously formed with the male thread portion (50a), the rotary operation head portion (50b) being formed at the side where the second opening portion (1h) is provided.

According to the aforementioned construction, the vehicle body reinforcement device may be easily mounted with less number of components. Thus, the first rod member 10 within the housing 1 may be easily and securely prevented from rotating about the axis.

According to first, second and third embodiments, the adjustment member (50) is disposed such that the side surface of the rotary operation head portion (50b) is contactable with the inner surface of the second opening portion (1h) of the housing (1) when the adjustment member (50) rotates in the direction orthogonal to the axis of the male thread portion (50a).

According to the aforementioned construction, the vehicle body reinforcement device may be easily mounted with less number of components. Thus, the first rod member 10 within the housing 1 may be easily and securely prevented from rotating about the axis. Because the components of the vehicle body reinforcement device may be easily mounted, the mass-productivity may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle body reinforcement device being configured to be supported on a vehicle body via first and second brackets that are disposed at opposing ends of the vehicle body in an axial direction of the vehicle body reinforcement device, comprising:
    a housing being connected to one of the first bracket and the second bracket, the housing including a first retaining portion and a second retaining portion each disposed at an inner portion of the housing, the inner portions that are spaced apart from each other by a predetermined distance in the axial direction;
    a first shaft member being contained in the housing and including a first end portion that is supported so as to be approachable and separable relative to the first retaining portion;
    a second shaft member including a first end portion that is connected to a second end portion of the first shaft member, the second shaft member including a second end portion that is connected to the other of the first bracket and the second bracket;
    a first biasing member being provided between the first end portion of the first shaft member and the first retaining portion;
    a second biasing member being provided between the second end portion of the first shaft member and the second retaining portion; and a pressing member supported on the first shaft member so as to be movable in a direction orthogonal to an axis of the first shaft member within the housing and to be contactable with an inner surface of the housing, the pressing member pressing the inner surface of the housing.

2. The vehicle body reinforcement device according to claim 1, further comprising:
an adjustment member being supported on the first axial member, the adjustment member adjusting a pressing force applied by the pressing member against the inner surface of the housing.

3. The vehicle body reinforcement device according to claim 1, further comprising:
a support member being extendingly provided in the axial direction of the first shaft member, the support member being connected to the first end portion of the first shaft member to support the first biasing member.

4. The vehicle body reinforcement device according to claim 1, wherein
the first biasing member includes a first free length in the axial direction of the first shaft member, the first free length that is set longer than a first length that is established when the first biasing member is disposed between the first end portion of the first shaft member and the first retaining portion of the housing in the axial direction; and
the second biasing member includes a second free length in the axial direction of the first shaft member, the second free length that is set longer than a second length that is established when the second biasing member is disposed between the second end portion of the first shaft member and the second retaining portion of the housing in the axial direction.

5. The vehicle body reinforcement device according to claim 1, further comprising:
a retaining member being retained in the housing, the retaining member preventing the second biasing member from moving in the axial direction, the retaining member serving as the second retaining portion.

6. The vehicle body reinforcement device according to claim 5, further comprising:
a resilient member being fitted to a groove portion that is formed at the inner surface of the housing, the resilient member preventing the retaining member from moving in the axial direction.

7. The vehicle body reinforcement device according to claim 1, wherein
the housing includes a bottomed cylindrical case having a bottom portion and a first opening portion;
the first retaining portion is provided at a position close to the bottom portion of the case; and
the second retaining portion is provided at the first opening portion of the case.

8. The vehicle body reinforcement device according to claim 1, wherein
one of the first biasing member and the second biasing member is made from an elastic body; and
the other of the first biasing member and the second biasing member is made from a spring member.

9. The vehicle body reinforcement device according to claim 2, wherein
the first shaft member includes
a thread hole being formed in the direction orthogonal to the axis of the first shaft member; and
a recess being continuously formed with the thread hole and containing the pressing member;
the housing includes
a second opening portion being disposed at a predetermined position opposing the recess and facing the thread hole; and
the adjustment member includes
a male thread portion threaded into the thread hole; and
a rotary operation head portion being continuously formed with the male thread portion, the rotary operation head portion being formed at a side where the second opening portion is provided.

10. The vehicle body reinforcement device according to claim 2, wherein
the adjustment member is disposed such that a side surface of the rotary operation head portion is contactable with an inner surface of the second opening portion of the housing when the adjustment member rotates in a direction orthogonal to an axis of the male thread portion.

* * * * *